(12) United States Patent
Deych et al.

(10) Patent No.: US 7,839,554 B2
(45) Date of Patent: Nov. 23, 2010

(54) MULTIPLE-QUANTUM WELL STRUCTURE WITH ELECTRIC FIELD CONTROL

(75) Inventors: Lev Deych, Fresh Meadows, NY (US);
Alexander Lisyansky, Albertson, NY (US)

(73) Assignee: Research Foundation of the City University of New York, New York, NY (US)

( * ) Notice: Subject to any disclaimer, the term of this patent is extended or adjusted under 35 U.S.C. 154(b) by 92 days.

(21) Appl. No.: 12/446,638

(22) PCT Filed: Oct. 22, 2007

(86) PCT No.: PCT/US2007/022408
§ 371 (c)(1), (2), (4) Date: Apr. 22, 2009

(87) PCT Pub. No.: WO2008/069872
PCT Pub. Date: Jun. 12, 2008

(65) Prior Publication Data
US 2010/0027097 A1 Feb. 4, 2010

(51) Int. Cl.
*G02B 1/07* (2006.01)
(52) U.S. Cl. ...................................... 359/263
(58) Field of Classification Search ............... 359/263, 359/245, 238; 372/50.11; 257/17, 21
See application file for complete search history.

(56) References Cited

U.S. PATENT DOCUMENTS

| 6,611,007 B2 | 8/2003 | Thompson et al. |
| 7,031,577 B2 | 4/2006 | Painter et al. |
| 7,760,787 B2 * | 7/2010 | Jikutani ................. 372/50.124 |

* cited by examiner

*Primary Examiner*—Timothy J Thompson
(74) *Attorney, Agent, or Firm*—Fish & Richardson P.C.

(57) ABSTRACT

In one aspect, the invention provides a defect multiple-quantum-well structure for manipulation of reflection and transmission of light by way of optical control of spatial distribution of electric field across the defect multiple-quantum-well structure. The defect multiple-quantum-well structure includes a pair of terminal multiple-quantum-well structures and a central multiple-quantum-well structure. The central multiple-quantum-well structure is sandwiched between the pair of terminal multiple-quantum-well structures. Each of the pair of terminal multiple-quantum-well structures has a band gap profile, and the central multiple-quantum-well structure has a band gap profile. The band gap profile of the central multiple-quantum-well structure is greater than the band gap profile of each of the pair of terminal multiple-quantum-well structures.

4 Claims, 1 Drawing Sheet

MULTIPLE-QUANTUM WELL STRUCTURE WITH ELECTRIC FIELD CONTROL

CLAIM OF PRIORITY

This application is a U.S. national phase application under 35 U.S.C. §371 of International Patent Application No. PCT/US2007/022408 filed Oct. 22, 2007, which claims the benefit of priority to U.S. Provisional Application No. 60/854,033 filed Oct. 24, 2006, the disclosures of all of which are hereby incorporated by reference in their entireties. The International Application was published in English on Jun. 12, 2008 as WO 2008/069872.

FIELD

The present invention relates to a multiple-quantum-well structure, and more particularly to optical control of spatial distribution of an electric field across a defect multiple-quantum-well structure.

BACKGROUND

There exists a large number of approaches to all-optical information processing devices. They fall in several categories depending on their applications. The largest current market is the telecommunication industry, which tries to anticipate future requirements to increase speed of the information processing by incorporating all optical devices that would not require transformation of signal from optical to electric form and back for the processing.

There is a need for devices that are wavelength selective as well as those that can manipulate with pulses containing many wavelengths. Some of the technologies directed to this market have already been commercialized. One can mention here micro-electro-mechanical-systems (MEMS) based devices, holographic optical switches, liquid-crystal-based switches, etc. Their speed is still limited, and therefore new ideas directed to improving this characteristic are being developed.

Among new approaches, which are in the R&D stage and have not yet reached the stage of commercialization, are directed to improving speed and other characteristics, such as on/off ratio, modulation depth, band width, etc., of wavelength sensitive devices, and which include:

Waveguide-based optical switches and modulators.
Photonic-crystal-based all-optical devices.
MQW-based electro-optical devices.

The first two on the list above are rather closely related to each other since they both exploit interference between light pulses separated and guided along two different channels. The interference can be influenced either by exploiting the natural non-linearity of the constituting materials or by inserting active elements, such as quantum dots whose properties can be changed by applying an electric field or by other ways. The difference between these two is their approaches to constructing waveguides-using more traditional internal reflection based waveguides or using photonic crystals for similar purposes.

The last of the devices listed above uses spectral region of exciton resonances for light transmission and quantum-confine Stark effect to control transmission at a given frequency. They are based, however, on MQW structures that drastically differ from embodiments of the present invention, and have therefore significantly different technological characteristics.

These existing approaches have the disadvantages of:
Low speed.
Difficulties in achieving tunability.
Lack of multi-functional capabilities.

Thus, there exists a need for an all-optical device that is tunable and has high speed and multi-function capabilities.

SUMMARY OF THE INVENTION

In one aspect, the invention provides a defect multiple-quantum-well structure for manipulation of reflection and transmission of light by way of optical control of spatial distribution of electric field across the defect multiple-quantum-well structure. The defect multiple-quantum-well structure includes a pair of terminal multiple-quantum-well structures and a central multiple-quantum-well structure. The central multiple-quantum-well structure is sandwiched between the pair of terminal multiple-quantum-well structures. Each of the pair of terminal multiple-quantum-well structures has a band gap profile, and the central multiple-quantum-well structure has a band gap profile. The band gap profile of the central multiple-quantum-well structure is greater than the band gap profile of each of the pair of terminal multiple-quantum-well structures.

BRIEF DESCRIPTION OF THE DRAWINGS

The figures of the drawings are briefly described as follows.

DETAILED DESCRIPTION

Figure 1:
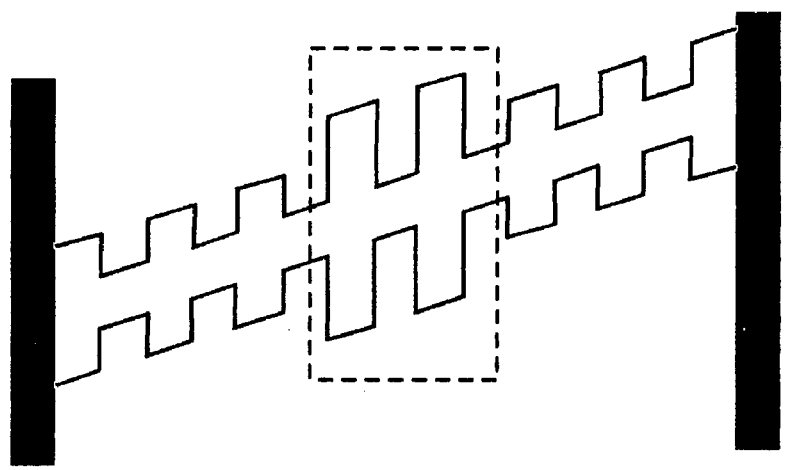
FIG. 1 is a diagrammatic representation of a MQW structure having a defect in a uniform field.

The embodiments of the present invention relate to a multiple-quantum-well structure, and more particularly, the embodiments of the present invention relate to a defect multiple-quantum-well structure for manipulation of reflection and transmission of light achieved by way of optical control of spatial distribution of electric field across the defect multiple-quantum-well structure.

Embodiments of the present invention provide a defect multiple-quantum-well structure for manipulation of reflection and transmission of light achieved by way of optical control of spatial distribution of electric field across the defect multiple-quantum-well structure, which avoids the disadvantages of the prior art.

Briefly stated, provided is a semiconductor heterostructure that can be used as a base element in a number of all-optical devices, such as ultra-fast all-optical switches, modulators, wavelength converters, and others. The structure includes multiple quantum wells having a defect part intentionally introduced in the central part of the structure. This defect creates a special shape for the reflection spectrum of the structure, which allows the system to exist in two distinct states of high and low reflectivity. The switching between these two states forms the basis for the operation of the structure. The position of the spectral features is controlled by a pump pulse exciting electron-hole pairs in the barrier regions of multiple-quantum-wells. Because of the special design of the defect portion of the structure, the excited carriers cannot penetrate across the defect, and as result thereof, the external electric field applied to the structure becomes enhanced across the defect region, and as such, the reflection spectrum of the structure is switched thereby switching the state of the system from high reflectivity to low or vice versa.

The novel features which are considered characteristic of the embodiments of the present invention are set forth in the appended claim. The embodiments of the present invention themselves, however both as to their construction and to their method of operation together with additional objects and advantages thereof will be best understood from the following description of the specific embodiments when read and understood in connection with the accompanying drawings.

Configuration

The embodiments of the present invention comprise a semiconductor heterostructure that can be used in a number of devices depending on optical control of propagation, reflection, and absorption of electromagnetic radiation, such as optical modulators, wavelength converters, optical shutters, switches, filters, etc.

The embodiments of the present invention exhibit so-called multiple-quantum-well structures, including alternating layers of two or more different types of semiconductors. All of the layers comprising the structure are divided into two groups, namely, thinner layers of a semiconductor with a narrower band gap, i.e., wells that are positioned between thicker layers of a different semiconductor with a wider band gap, i.e., barriers.

The spatial profile of the band gaps in a multiple-quantum-well (MQW) structure determines all of its properties. In particular, electron-hole pairs excited in a narrow gap well see the interface with a wider band gap barrier as a potential barrier, which they cannot penetrate if the width of the barrier is large enough. As a result, the motion of the carriers is confined inside the wells. In contrast, electron-hole pairs excited in the barrier layers can move freely throughout the entire structure. The thickness of the well layers ($\approx$30-100 Å) is chosen small enough that the motion of electrons and holes is quantized in the direction perpendicular to the plane of the well layers. The thickness of the barrier layers ($\approx$30-100 Å) is taken to be large enough to prevent tunneling of electrons and holes between adjacent wells and direct interaction between them. Usually the difference between band gaps of wells and barriers is achieved by changing the chemical composition of the layers. For instance, in AlGaAs/GaAs quantum well structures, adding Al (up to 30%) increases the band gap of the resulting material, turning it into a barrier. Using the well developed molecular beam epitaxy (MBE) or chemical vapor deposition (CVD) technologies, one can grow structures with predefined thicknesses and compositions of the layers, and hence, engineer the band-gap profile of the resulting structure. Band-gap engineering is currently a well developed technology that is utilized in the embodiments of the present invention.

A structure embodying the present invention comprises three MQW structures deposited one on top of the other. The central part, called a defect, is a short (1-5 layers) structure sandwiched between two longer (30-100 layers) structures. The band gap profiles of the terminal MQWs can be identical, while the defect part includes barriers whose band gap is larger than the band gaps of the barriers of either of the terminal MQW structures. Schematically, the band gap profile of the system with a single quantum well in its defect part is shown in FIG. 1, which is a diagrammatic representation of a MQW structure having a defect in a uniform field.

The terminal MQWs in FIG. 1 (not shown completely) include well layers with a band gap $E_{g2}$ and barrier layers with a band gap $E_{g1}$. The band gap of the barriers in the defect layers, $E_{g3}$, obeys the condition $E_{g3} > E_{g1}$. This condition plays a central role in the function of the structure of the embodiments of the present invention. This role is twofold and reflects a synergy between electric and optical properties of the structure of the embodiments of the present invention.

Figure 2:
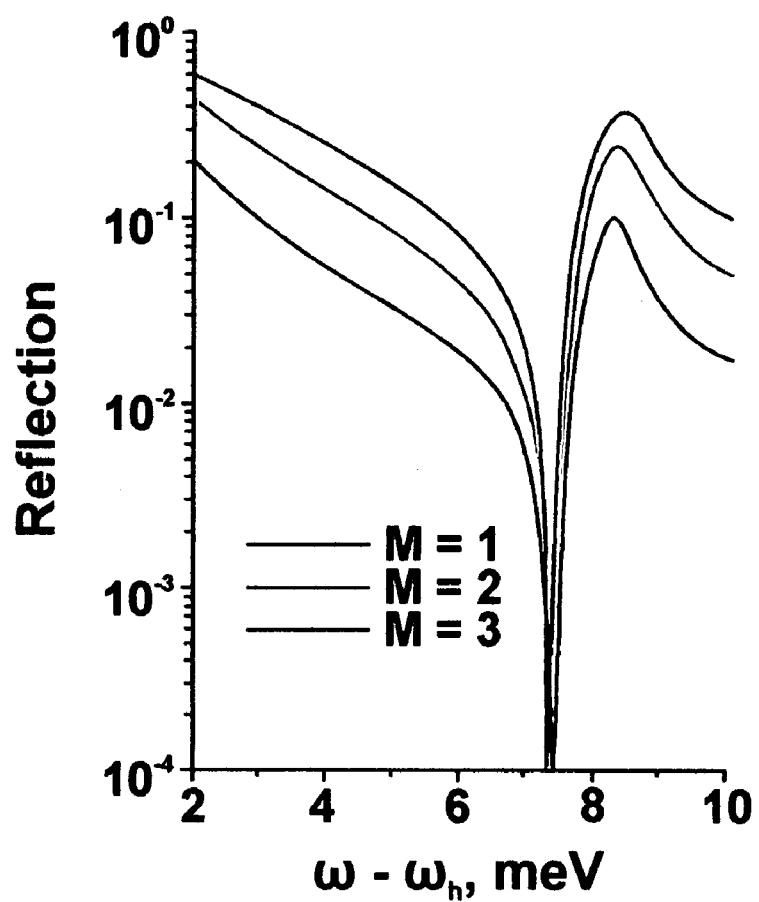
FIG. 2 is a graph of the reflection of a Bragg MQW structure having a defect in the vicinity of a defect frequency.

Due to increased band gap, the characteristic frequency, which determines optical spectra of quantum wells, is different for the defect layers than for the rest of the structure. This difference is shown to result in a modification of the reflection spectra of the structures of the embodiments of the present invention, which are very beneficial for possible optoelectronic applications. An example of such a spectrum is shown in FIG. 2, which is a graph of the reflection of a Bragg MQW structure having a defect in the vicinity of a defect frequency, for a special class of MQW structures in which the width of the barriers is chosen to coincide with half of the wavelength of the radiation emitted by the quantum wells constituting the terminal parts of the structure. One can see that the reflection exhibits a very strong change (up to 40 dB) over a narrow frequency interval.

This spectrum can be very beneficial for switching, modulating, as well as other applications involving optical signal processing if the positions of the maximum and minimum reflections can be moved by an optical apparatus with sufficient speed. The structure of the embodiments of the present invention is specifically designed to provide this possibility.

To this end, the structure is placed in a uniform electric field, which shifts the spectrum shown in FIG. 2 to the lower frequencies due to the quantum confined Stark effect, which was used successfully in a number of devices, such as optical switches, lasers, etc. The magnitude of the field is chosen so that the position of the minimum reflection coincides with the working frequency of the structure. Depending upon the intended application, this can be an off (for reflection based devices) or on (for transmission based devices) state. By changing the electric field, one can change the working frequency of the device. Thus, the structure of the embodiments of the present invention is attractive for applications requiring tuning capability.

The switching between on and off states occurs in the structure with the help of a control optical pulse, which propagates through the structure in its growth direction. The spectral shape of this pulse is chosen in a way that it would mostly excite electrons from the valence to the conductance band of the barrier layers belonging to the terminal layers, but with energies smaller than the $E_{g3}$-$E_{g1}$. The excited electrons and holes are located in the barrier regions of the terminal structures and will therefore be able to move freely. The defect region, however, presents a barrier for carriers excited in both terminal structures, so the carriers remain confined within their respective MQWs. These carriers partially screen the applied external electric field reducing it's magnitude inside the terminal layers, and significantly increasing it inside the defect layer. As a result, the reflection at the working frequency increases as the position of the maximum reflection moves toward lower frequencies and the system switches its state. The same effect can be used for other purposes as well. For instance, a modulation of the electric field caused by the propagation of a control pulse modulates the reflectivity of the structure and therefore the intensity of the probe pulse propagating through or reflected from the structure. This modulation can also be used for wavelength conversion as well.

The success of the structure of the embodiments of the present invention depends upon the recovery time of the carrier population. This time determines how fast the carrier distribution and therefore the electric field in the structure can change. The structure offers several possibilities in this regard. The fastest changes in the field and reflectivity occur at the femtosecond scale and are related to coherent evolution of the excited electron-hole pairs. Of greatest practical interest, however, is the picosecond region, which can be achieved by utilizing the relaxation of an initial state of electron-hole population—an intermediate quasi-equilibrium state in which electrons in barriers and wells come to equilibrium with each other, but not with the holes. The last of the possibilities involves changes occurring in nanoseconds as global equilibrium is established by electron-hole recombination. The unique feature of the structure is that it offers access to all of these different modes of operations.

Advantages
   Operation at ultra-fast repetition rate with a bandwidth of the order of THz, which is extremely important for future generations of optical networks, but it can also be used for applications requiring slower response times. The physical properties of the structure of the embodiments of the present invention are determined by a hierarchy of processes occurring on different time scales from as fast as picoseconds to as slow as nanoseconds. These time scales determine possible speeds of future devices utilizing the structure.
   Potential for tunability. Working frequencies of the structure lie in the vicinity of optical resonances of the underlying materials. The latter can be controlled by applying external electric field.
   The spectral proximity of resonances allow using the structure as a multi-functional element. It can perform not only passive logical operations or wavelength conversion but also can be used as an optical amplifier and/or a light emitting device.
   A large number of control parameters can be used to optimize its technological characteristics and give more flexibility in designing an optimal structure for specific applications.

Applications
   Optical modulators, tunable mirrors, optical switches, and narrow-band tunable optical filters are just some examples of devices that would be applications of the embodiments of the present invention.

CONCLUSIONS

In order to overcome thermal instability of the structure, one needs to use such material systems as ZnO-based quantum wells (QW), whose growth technology is still under development. It can be expected, however, that ZnO based QW will be as accessible as standard GaAs based structures in the near future.

It will be understood that each of the elements described above or two or more together may also find a useful application in other types of constructions differing from the types described above.

While the embodiments of the present invention have been illustrated and described as embodied in a defect multiple-quantum-well structure for manipulation of reflection and transmission of light achieved by way of optical control of spatial distribution of electric field across the defect multiple-quantum-well structure, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention. The invention is defined solely with regard to the claims appended hereto, and equivalents of the recitations therein.

Without further analysis the foregoing will so fully reveal the gist of the embodiments of the present invention that others can by applying current knowledge readily adapt it for various applications without omitting features that from the standpoint of prior art fairly constitute characteristics of the generic or specific aspects of the embodiments of the present invention.

The invention claimed is:

1. A defect multiple-quantum-well structure for manipulation of reflection and transmission of light by way of optical control of spatial distribution of electric field across the defect multiple-quantum-well structure, the defect multiple-quantum-well structure comprising:
   a pair of terminal multiple-quantum-well structures; and
   a central multiple-quantum-well structure;
   wherein said central multiple-quantum-well structure is sandwiched between said pair of terminal multiple-quantum-well structures;
   wherein each of said pair of terminal multiple-quantum-well structures has a band gap profile;
   wherein said central multiple-quantum-well structure has a band gap profile; and
   wherein said band gap profile of said central multiple-quantum-well structure is greater than said band gap profile of each of said pair of terminal multiple-quantum-well structures.

2. The defect multiple-quantum-well structure of claim 1, wherein the central multiple-quantum-well structure comprises a structure of between 1-5 deposition layers.

3. The defect multiple-quantum-well structure of claim 1, wherein the each of the terminal multiple-quantum-well structures comprises a structure of between 30-100 deposition layers.

4. The defect multiple-quantum-well structure of claim 1, wherein propagation of an optical pulse through the defect multiple-quantum-well structure causes a frequency change in a minimum reflectivity of the defect multiple-quantum-well structure.

* * * * *